(12) United States Patent
Asakura

(10) Patent No.: US 7,764,455 B2
(45) Date of Patent: Jul. 27, 2010

(54) METHOD AND APPARATUS FOR DETECTING DEFECTS OF SERVO DATA IN A DISK DRIVE

(75) Inventor: Makoto Asakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 392 days.

(21) Appl. No.: 12/031,375

(22) Filed: Feb. 14, 2008

(65) Prior Publication Data

US 2008/0239536 A1    Oct. 2, 2008

(30) Foreign Application Priority Data

Mar. 29, 2007  (JP)  ............... 2007-088830

(51) Int. Cl.
  *G11B 15/04*   (2006.01)
(52) U.S. Cl. ...................................... 360/60
(58) Field of Classification Search .............. 360/60, 360/77.08, 75, 51, 48, 53, 77.04
  See application file for complete search history.

(56) References Cited

U.S. PATENT DOCUMENTS

| | | | | |
|---|---|---|---|---|
| 4,536,809 A | * | 8/1985 | Sidman ................. | 360/77.04 |
| 4,656,538 A | * | 4/1987 | Mattson ................. | 360/77.08 |
| 4,816,938 A | * | 3/1989 | Cowen et al. ............ | 360/75 |
| 5,319,508 A | * | 6/1994 | Tsunoda et al. .......... | 360/77.08 |
| 5,784,216 A | * | 7/1998 | Zaharris ................. | 360/48 |
| 5,838,512 A | * | 11/1998 | Okazaki ................. | 360/51 |
| 6,111,714 A | * | 8/2000 | Ueda et al. ............. | 360/60 |
| 6,215,608 B1 | * | 4/2001 | Serrano et al. .......... | 360/60 |
| 6,307,704 B1 | * | 10/2001 | Seo et al. ............... | 360/77.08 |
| 6,388,829 B1 | * | 5/2002 | Nazarian ................. | 360/48 |
| 6,414,809 B1 | * | 7/2002 | Sakai et al. ............. | 360/60 |
| 6,606,216 B1 | * | 8/2003 | Liikanen et al. ......... | 360/77.08 |
| 6,671,110 B2 | * | 12/2003 | Baba et al. ............. | 360/31 |
| 6,898,038 B1 | * | 5/2005 | Fennema et al. .......... | 360/60 |
| 6,906,883 B2 | * | 6/2005 | Chu et al. ............... | 360/75 |
| 6,941,419 B2 | * | 9/2005 | Haines et al. ........... | 711/112 |
| 6,995,941 B1 | * | 2/2006 | Miyamura et al. ........ | 360/75 |
| 7,206,150 B2 | * | 4/2007 | Koshkina et al. ......... | 360/53 |
| 7,224,543 B1 | * | 5/2007 | Abrishamchian et al. ... | 360/60 |

(Continued)

FOREIGN PATENT DOCUMENTS

JP          2513027          12/1990

(Continued)

OTHER PUBLICATIONS

Japanese Office Action dated Aug. 18, 2009 for Appln. No. 2007-088830.

*Primary Examiner*—Fred Tzeng
(74) *Attorney, Agent, or Firm*—Pillsbury Winthrop Shaw Pittman, LLP

(57) ABSTRACT

According to one embodiment, in a disk drive having a disk medium that has a plurality of sectors, in each of which servo data containing a servo-burst patterns is recorded, a CPU calculates the reliability value of a sector to be evaluated, from a ratio of the sum of the servo-burst values acquired from the sector, to a value obtained by performing low-pass filtering operation on the sum acquired at the time of detection or acquired for the immediately preceding sample. The CPU then determines whether the sector is a defective sector having defective servo-burst patterns, on the basis of the reliability value thus calculated.

14 Claims, 6 Drawing Sheets

U.S. PATENT DOCUMENTS

| | | | |
|---|---|---|---|
| 7,518,816 B2 * | 4/2009 | Fennema et al. | 360/60 |
| 2009/0128945 A1 * | 5/2009 | Ding et al. | 360/60 |

FOREIGN PATENT DOCUMENTS

| | | |
|---|---|---|
| JP | 06-349214 | 12/1994 |
| JP | 2512549 | 4/1996 |
| JP | 11-353829 | 12/1999 |
| JP | 2003-141837 | 5/2003 |

* cited by examiner

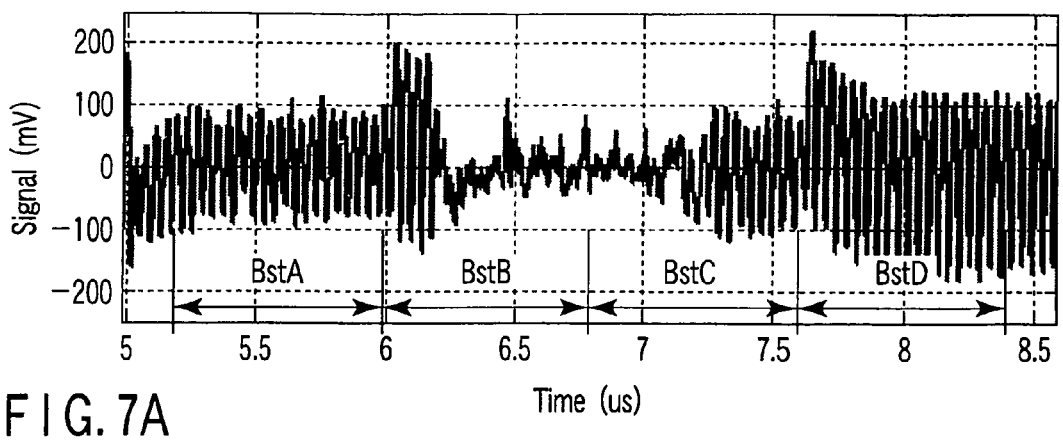
F I G. 7A
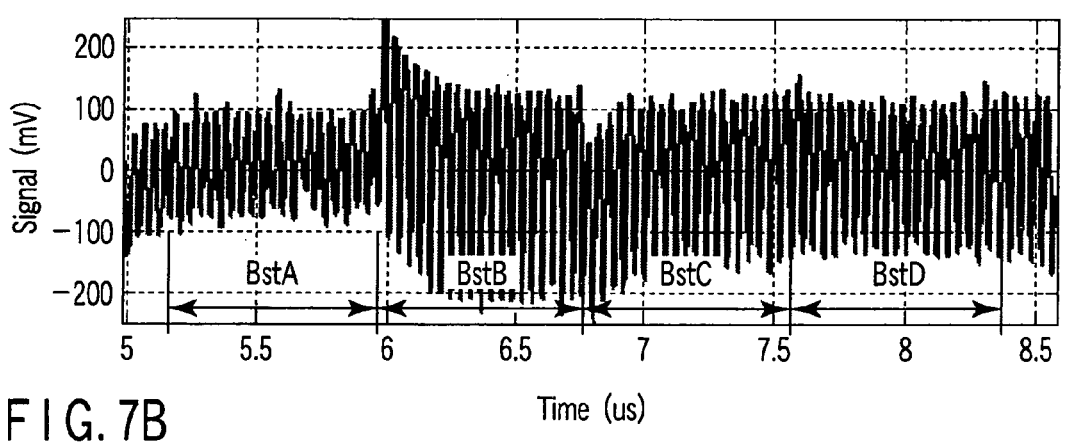
F I G. 7B
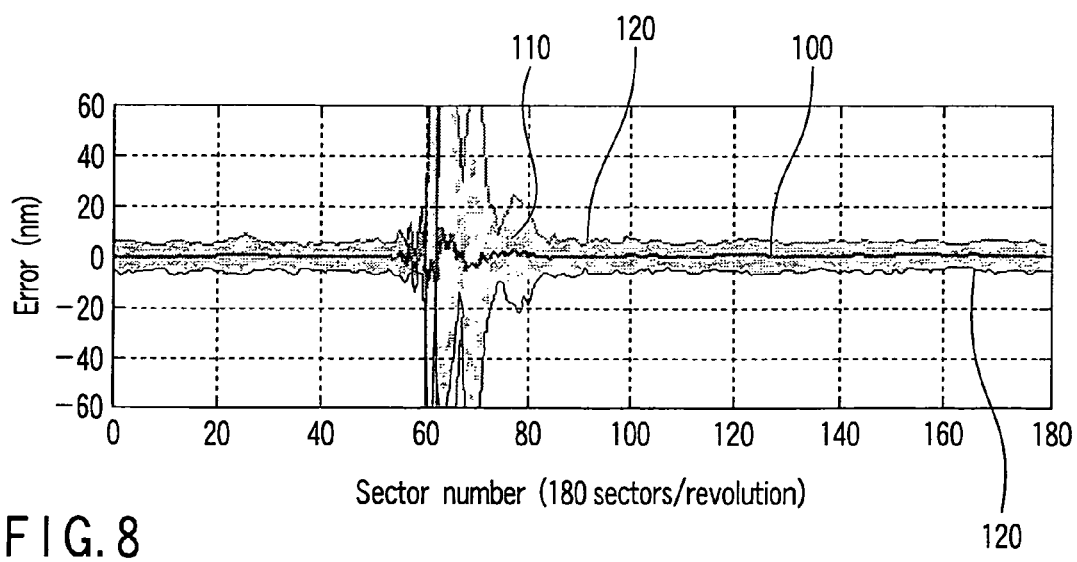
F I G. 8

METHOD AND APPARATUS FOR DETECTING DEFECTS OF SERVO DATA IN A DISK DRIVE

CROSS-REFERENCE TO RELATED APPLICATIONS

This application is based upon and claims the benefit of priority from Japanese Patent Application No. 2007-088830, filed Mar. 29, 2007, the entire contents of which are incorporated herein by reference.

BACKGROUND

1. Field

One embodiment of the present invention relates to a disk drive that uses a disk medium in which servo data is recorded. More particularly, the embodiment relates to a disk drive that has the function of detecting defects in the servo data recorded in a disk medium.

2. Description of the Related Art

In recent years, a servo-writing method, also known as servo-forming method, has come to attract an attention in the field of disk drives, a representative example of which is the hard disk drive. In this method, the servo data for controlling the position of the head is first formed on one side of a stamper and then transferred instantaneously onto a disk medium. The servo-writing method is, for example, either a magnetic transfer method or a method of forming servo data on patterned media.

The servo-writing method, or servo-forming method, is advantageous in many respects over the ordinary method that uses a dedicated device called servo track writer. More specifically, the servo-writing method can write or form servo data with high efficiency. However, the servo-writing method has some problems. The servo-writing method, which employs, for example, magnetic transfer, may erroneously transfer part of the servo data from the master disk to a disk medium, due to foreign matter that has entered the disk drive. A similar problem may also develop in the method of forming servo data on a patterned medium that is a disk medium of discrete-track structure.

Servo data contains address codes and servo-burst patterns. The address codes represent the addresses of the tracks (cylinders) provided on a disk medium. The servo-burst patterns are used to detect the positions in each track. If the servo data is erroneously transferred to a disk medium, some of the servo-burst patterns will not be formed in the disk medium. In other words, some of the servo-burst patterns will become defective. This is a serious problem.

If the servo-data part erroneously transferred exist in the preamble region of the servo data, a synchronous acquisition error will develop and the servo address marks (SAMs) will not be detected. Consequently, wrong servo addresses will be read. Note that the servo address marks constitute a signal pattern that specifies the beginning part of the servo address data. If the servo-data part erroneously transferred exist in the address region of the servo data, the SAMs will inevitably not be detected or wrong servo addresses will inevitably be read. If the servo-data part erroneously transferred exist in the servo-burst region of the servo data, the off-track will not be accurately detected.

The conventional disk drive has the function of detecting servo errors in preparation for reproducing any servo signal read from the head. However, this function cannot serve to detect defects in the servo-burst pattern, which have resulted from the erroneous transfer of the servo data. The servo signal generated from any defective part of the servo-burst pattern is considered to have a normal value though it actually has an erroneous value. As a result, the normal servo operation is performed, inevitably propagating the erroneous value to normal sectors of the disk medium. The erroneous value of the servo signal will result in a head-positioning error over many sectors of the disk medium.

A method of examining a disk medium for erroneous servo-data transfer has been proposed (see, for example, Jpn. Pat. Appln. No. 2003-141837.) In the method proposed, the moderate fluctuation inherent to a disk medium, to which a pattern has been transferred, is distinguished from a partial defect resulting from dust, with respect to the entire circumference of the medium. It is then determined whether any defect has resulted from dust. More specifically, whether an erroneous servo-data transfer has performed or not is determined in accordance with the detachment rate of moving averages, i.e., the ratio of the amplitude for the preamble region (i.e., synchronous burst region) of servo data, to the amplitude of moving averages for 15 servo sectors, of which some preceding the preamble region and the others following the preamble region.

The method described in the preceding paragraph is a technique that is applied to the servo-writing step or the servo-forming step. It cannot be used to examine a disk medium already incorporated in a disk drive, for defects that may exist in the servo-burst pattern recorded in the medium.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 7A and 7B are diagrams representing relationships a burst defect and servo signals have in the embodiment of this invention;

FIG. 8 is a diagram showing how the head-positioning accuracy changes, from one track to another, demonstrating the advantage of the embodiment of the invention;

DETAILED DESCRIPTION

Various embodiments according to the invention will be described hereinafter with reference to the accompanying drawings. In general, according to one embodiment of the invention, there is provided a disk drive that has the function of reliably detecting defects in the servo-burst patterns recorded in a disk medium.

(Configuration of the Disk Drive)

Figure 1:
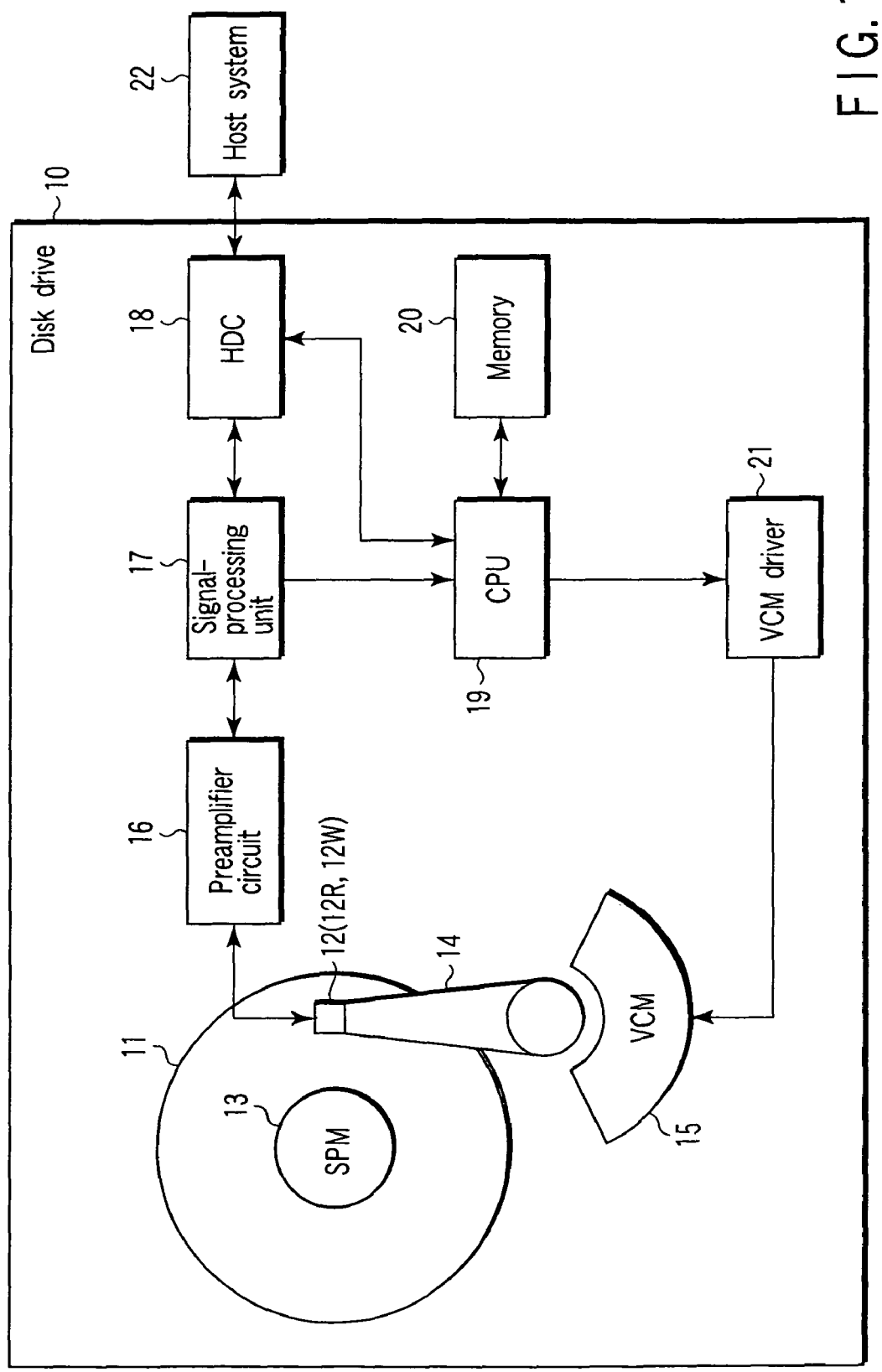
FIG. 1 is a block diagram showing the major components of a disk drive according to an embodiment of the present invention.

As shown in FIG. 1, the disk drive 10 according to the embodiment has a disk medium 11 (i.e., magnetic recording medium), a head 12, and a spindle motor (SPM) 13. The spindle motor 13 can rotate the disk medium 11. The disk medium 11 is a patterned medium called discrete-track medium (DTM) (hereinafter, also called DTM-type disk medium) in which servo data is recorded in the form of prepits that define a magnetic/non-magnetic pattern. The DTM-type disk medium has a data region. The data region is divided into tracks by non-magnetic guards.

The servo data contains address codes and servo-burst patterns. Each address code represents the address of a track or cylinder. Each servo-burst pattern is used to detect the position the head takes in a track. In most cases, the servo data contains four servo-burst patterns A to D, which differ in phase.

The head 12 is mounted on an actuator 14 that can be driven by a voice coil motor (VCM) 15. The head 12 includes a read head element 12R and a write head element 12W. The read head element 12R can read data (i.e., servo data and user data) from the disk medium 11. The write head element 12W can write data on the disk medium 11.

The VCM 15 is supplied with a drive current from a VCM driver 21 and is driven. The actuator 14 is a head-moving mechanism that is driven and controlled by a microprocessor (CPU) 19. When controlled by the CPU 19, the actuator 14 moves the head 12 to, and positions the same, at a desired position (desired track or desired cylinder) on the disk medium 11.

The disk drive 10 has a preamplifier circuit 16, a signal-processing unit 17, a disk controller (HDC) 18, a CPU 19 and a memory 20, in addition to the head-disk assembly described above. The preamplifier circuit 16 has a read amplifier and a write amplifier. The read amplifier amplifies the read-data signal output from the read head element 12R. The write amplifier supplies a write-data signal to the write head 12W.

The signal-processing unit 17 is a read/write channel that processes a read/write data signal (including a servo signal corresponding to servo data). The signal-processing unit 17 incorporates a servo decoder, which reproduces servo data containing servo-burst values (Bst A to D), from the servo signal. The HDC 18 can function as an interface between the disk drive 10 and a host system 22 (e.g., personal computer or any one of various digital apparatuses). The HDC 18 performs the transfer of read data and write data between the disk medium 11 and the host system 22.

The CPU 19 is the main controller in the disk drive 10 and performs the process of detecting servo-defects and the process of controlling the positioning of the head 12 (servo operation) in, the present embodiment. The memory 20 includes a RAM and a ROM, in addition to a flash memory (EEPROM, i.e., a nonvolatile memory). It stores various data items and programs that control the CPU 19 uses to perform various controls.

(Process of Detecting Servo Defects)

The disk drive according to the present embodiment has a function of detecting defects in the servo-burst patterns when servo operation is performed after the DTM-type disk medium 11 has been incorporated into it. The servo operation is a positioning control that moves the head 12 to a target position over the disk medium 11.

Foreign matter may enter the disk drive while the servo data is being transferred from the stamper to the medium 11 or while the stamper is being produced. In this case, the resulting servo-burst patterns formed on the medium 11 inevitably have defective parts. In the radial direction of the medium 11, each defective part extends for about 10 μm, for example, over 10 tracks (cylinders) or more. In the circumferential direction of the medium 11, the defective part extends for a distance much shorter than the length of a servo sector.

The sequence of detecting servo defects will be explained with reference to FIG. 2 to FIG. 6.

Figure 2:
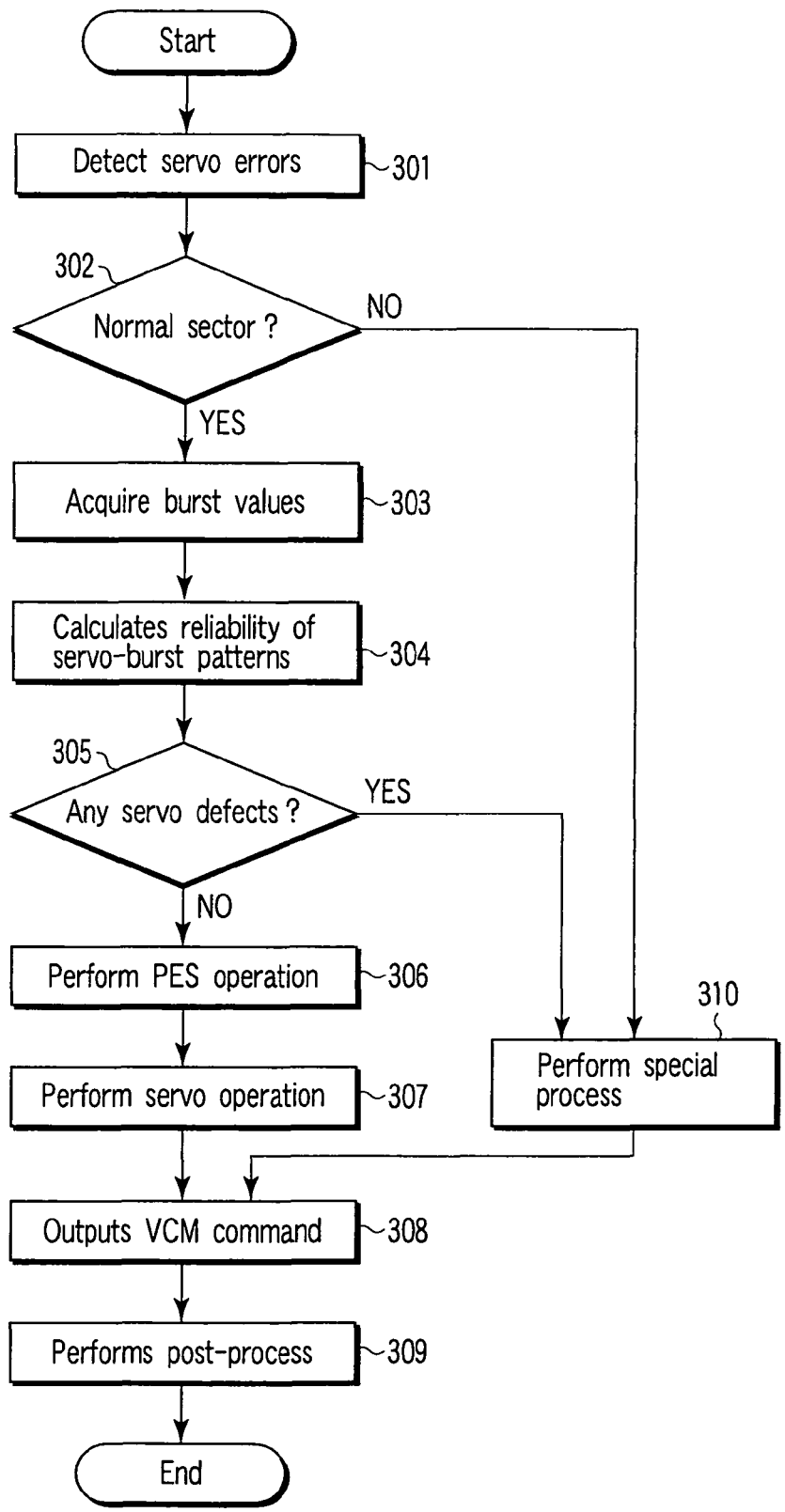
FIG. 2 is a flowchart explaining the sequence of detecting servo defects in the embodiment.

As shown in the flowchart of FIG. 2, the CPU 19 starts performing an ordinary process of detecting servo errors, when a servo-interruption instruction is generated, initiating a servo operation (Block 301). More precisely, the CPU 19 reads the channel information about the present servo sector, as a variable, and determines whether a servo address mark (SAM) and thermal asperity (AT) have been detected. Further, the CPU 19 compares the track (cylinder) address detected with the target-track address, determining whether they differ in several bits. If the track address and the target-track address differ in several bits, it is quite probable that the SAM position has been erroneously detected.

If servo errors are detected (if NO in Block 302), the CPU 19 terminates the ordinary servo operation and performs a special process to cope with the servo error (Block 310). That is, the CPU 19 interrupts the data writing in, for example, the target track. Then, the CPU 19 gives a VCM command to the VCM driver 21, preventing the output of the VCM 15 from abruptly changing.

The CPU 19 may keep performing the servo operation as in the conventional disk drive if it determines that the servo data is normal (if YES in Block 302), as in the conventional disk drive. However, the CPU 19 will not perform the special process if the address code is normal, even if the servo-burst patterns transferred have defects.

In the present embodiment, the CPU 19 performs a process of detecting the defective parts of servo-burst patterns (Blocks 303 to 305). First, the CPU 19 acquires the burst values (Bst A to D) that are contained in the servo data recorded in the target sector (Block 303). More precisely, the read head element 12R of the head 12 reads the servo-burst patterns (i.e., patterns A to D different in phase) from the target sector of the disk medium 11. The signal-processing unit 17 reproduces a servo signal from the head 12 and outputs the burst values (Bst A to D), as amplitudes of the burst patterns A to D, to the CPU 19.

Usually, the CPU 19 uses the burst values (Bst A to D), calculating a positioning error (that is, performing PES operation) (Block 306). Thus, the CPU 19 detects the position the head 12 assumes in a track (that is, finding a positioning error with respect to the centerline of the track).

Utilizing the burst values (Bst A to D) it has acquired, the CPU 19 calculates the reliability of the servo-burst patterns (Block 304). More precisely, the CPU 19 calculates the reliability from the sum of the burst values (Bst A to D) as will be described later. The CPU 19 then compares the reliability with a reference value for detecting defects, thereby determining whether the servo-burst patterns have defects (Block 305).

If the CPU 19 determines that the servo-burst patterns have no defects (NO in Block 305), it performs the ordinary servo operation. That is, it performs the PES operation, thus finding an error of positioning the head 12 (Block 306). The CPU 19 also performs a servo operation in order to position the head 12 at the target position (Block 307). To be more specific, the CPU 19 calculates a multi-rated output value (i.e., control value or VCM output) that is optimal for the VCM 15 so that the actuator 14 may be appropriately driven. Note that the servo operation includes feedback calculation and updating of the feed-forward compensation value for suppressing the synchronous residues.

Further, the CPU 19 coverts the VCM output obtained in the servo operation, to an analog signal. The analog signal is output to the VCM driver 21 (Block 308). In other words, the command values sequentially output are updated in respective registers, because a multi-rated control is performed. The CPU 19 switches one registered value to another, at appropriate timing, and outputs each value, as an output, to the VCM driver 21.

Thereafter, the CPU 19 performs a pre-operation to shorten the time of the next servo operation and a post-process of low priority, e.g., auxiliary process of determining the state, which must be performed to achieve a successful servo operation (Block 309). Thus, the servo-interruption process is terminated.

The CPU 19 may determine that the servo-burst patterns have defects (YES in Block 305). In this case, a special process is performed to cope with the servo error (Block 310) as described above. Then, the CPU 19 outputs a VCM command to the VCM driver 21 (Block 308) so that the output of the VCM may not change abruptly. Further, the CPU 19 performs a post-process (Block 309). In this case, too, the servo-interruption process is terminated.

(Method of Calculating the Reliability)

A method of calculating the reliability of servo-burst patterns in the present embodiment will be explained.

FIGS. 7A and 7B are diagrams representing relationships a burst defect and servo signals (servo-burst signals Bst A to D) have in the embodiment of this invention. As pointed out above, the disk medium 11 is a DTM-type disk medium.

Assume that the servo-burst patterns formed on the DTM-type disk medium 11 have defective parts (i.e., defective patterns). The defective patterns can be detected from the waveforms of the servo-burst signals (Bst A to D) that have been reproduced.

FIG. 7B shows the waveform of a signal reproduced from normal servo-burst patterns. FIG. 7A shows the waveform of a signal which has been reproduced from servo-burst patterns including servo-burst pattern B that has a defect. As is evident from FIG. 7A, the signal disappears at the middle of the second burst pattern B and reappears at the second half of the third burst pattern C. The region in which the signal disappears becomes narrower as the head 12 is moved forwards over 10 tracks (cylinders) and backwards over 10 tracks, too. The defective part of pattern B has resulted from a defective part extending for about 8 μm.

A defective pattern, if any, results in a non-signal region in the waveform of the reproduced signal. This greatly reduces the total amplitude of the servo-burst signals (Bst A to D). Hence, the CPU 19 can detect defects, if any, in the servo-burst patterns if it detects a change in the total amplitude of the servo-burst signals.

The disk drive according to this embodiment has a unit that calculates the reliability. The reliability-calculating unit will be described with reference to FIG. 4. In practice, the CPU 19 performs the function of the reliability-calculating unit. The reliability-calculating unit calculates reliability value RV from the sum of four burst-amplitude values (Bst A to D). In this embodiment, however, the reliability-calculating unit generates a normalized ability value RV, not a simple sum of the burst-amplitude values (Bst A to D).

Figure 4:
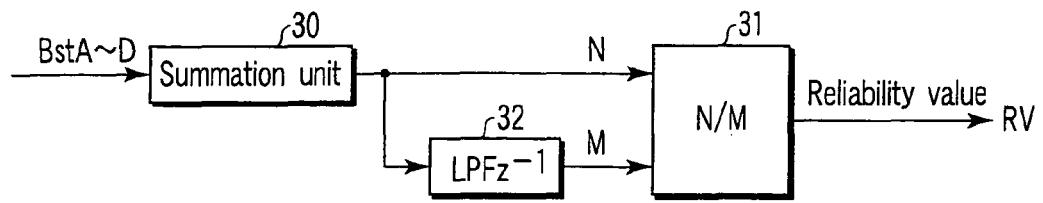
FIG. 4 is a block diagram explaining how the reliability-calculating section calculates reliability in the embodiment.

As FIG. 4 shows, the reliability-calculating section comprises a sum-calculating unit (summation unit) 30, an evaluation unit 31, and a low-pass filtering (LPF) unit 32. The sum-calculating unit 30 adds the four burst-amplitude values (Bst A to D) reproduced by the signal-processing unit 17, generating a burst-value sum N. The burst-value sum N is output to the evaluation unit 31. The evaluation unit 31 supplies the burst-value sum N to the LPF unit 32.

The LPF unit 32 is a low-pass filtering operation unit, i.e., the CPU 19. It performs an LPF operation in order to monitor a band that the moderate fluctuation developing in one track. More precisely, the LPF unit 32 performs a delayed operation on the sample immediately preceding the target sample, generating an LPF-value M for the burst-value sum N obtained from the sample preceding the target sample. The LPF-value M is output to the evaluation unit 31. Alternatively, the LPF unit 32 may output an LPF-value M for the present burst-value sum N, not the burst-value sum N obtained from the sample preceding the target sample.

The LPF-value M can be attained through a low-pass filtering operation in which the LPF band is set at, for example, about 1 kHz. This value is approximate to the motion average of burst-value sum N. If the transfer of a one-track servo pattern scarcely fluctuates, the cut-off band may be set to about 70 Hz. In this case, the LPF-value M can be regarded as almost the motion average of burst-value sum N for the present track.

The evaluation unit 31 finds the ratio of the burst-value sum N to the LPF-value M. (The ratio indicates whether the burst-value sum N has changed or not). The ratio thus obtained is applied, generating a normalized ability value RV. The ability value RV indicates an abrupt change of the sum of the four burst-amplitude values (Bst A to D). The CPU 19 uses the ability value RV as will be described later, in order to determine whether the servo-burst patterns have defects. In most cases, the ability value RV represents a low reliability if is equal to or smaller than a certain preset value.

Figure 5:
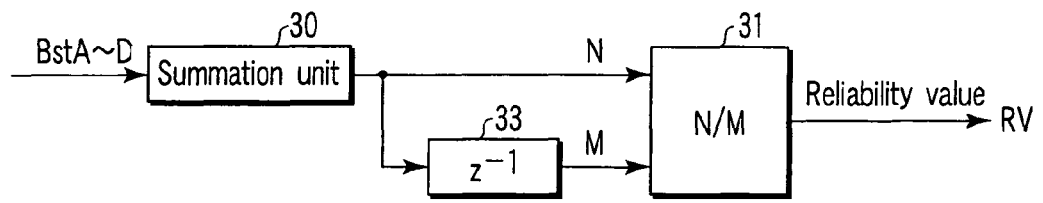
FIG. 5 is a block diagram showing a modified reliability-calculating section that may be used in the embodiment.

The reliability-calculating unit may be modified to such a unit as illustrated in FIG. 5. In the modified reliability-calculating unit, a delay-operation unit 33 that delays one sample is used in place of the LPF unit 32. Hence, in the modified reliability-calculating unit, the evaluation unit 31 finds the ratio of the burst-value sum N obtained from the immediately preceding sector, to the LPF-value M, and this ratio is applied, generating a normalized ability value RV.

As already mentioned, the radio of the burst-value sum N to the LPF-value M is obtained and applied, calculating a normalized ability value RV. This is done, for the following two reasons.

The first reason is the fact that the sum of burst-amplitude values changes in accordance with the position the head 12 assume in the radio direction of the disk medium 11. That is, the sums detected at an inner track, a middle track and an outer track, respectively, differ from one another. Generally, the signal generated by the head 12 gradually changes in amplitude as the head moves across the inner tracks and the outer tracks. Therefore, the sum of the four burst-amplitude values (Bst A to D) tends to change gradually as the head 12 moves so. If the sum of the four burst-amplitude values so changes, the flawless parts of any servo-burst pattern may be detected as defective, and conversely, the defective parts of any servo-burst pattern may be detected as flawless. To prevent this problem, an average of all sectors of the present track is obtained, and the burst-value sum N normalized as this ratio is employed as ability value RV. In this case, the LPF-value M can be regarded as the sum of average amplitudes obtained by the head 12 staying at the present position with respect to the radial direction of the medium 11. A sum of burst-amplitude values, normalized with the average of all sectors, is thereby attained.

The second reason is related to the fluctuation of the sum of the four burst-amplitude values over the sectors of one track on the disk medium 11. The sum of the four burst-amplitude values over the sectors of one track has almost a constant value in most cases. On the DTM-type disk medium 11, however, the sum of the four burst-amplitude values moderately fluctuates for each sector, more often than not, depending on the position the sector assumes in the track. The servo-burst patterns transferred from the master disk to the disk medium 11 may slightly differ in size due to the non-uniform gap between from the master disk and the disk medium 11 and to the uneven magnetic transfer of the patterns. If this happen, the LPF cut-off band set to the above-mentioned value cannot cope with the moderate change in the burst-value sum for one track. Inevitably, burst defects may be erroneously detected.

Therefore, the LPF cut-off band is set to such a value that the LPF-value M may be regarded as a moving average of the burst amplitudes for 10 to 20 sectors. Thus, the LPF cut-off band can cope with the moderate change in the burst-value sum for one track.

The ability value RV may be calculated by any other method if it serves to detect an abrupt change of the sum of the four burst-amplitude values. For example, the ability value RV may be calculated not from the burst-value sum N, i.e., Bst A+Bst B+Bst C+Bst D, but from two burst-value sums, e.g., Bst A+Bst B and Bst C+Bst D. No matter whether obtained from burst-value sum N or from the two burst-value sums, the ability value RV is basically the same. Hence, any sector where the sum of the four burst-amplitude values abruptly changes can be determined to be defective.

(Process of Detecting Defects in Servo-Burst Patterns)

Figure 6:
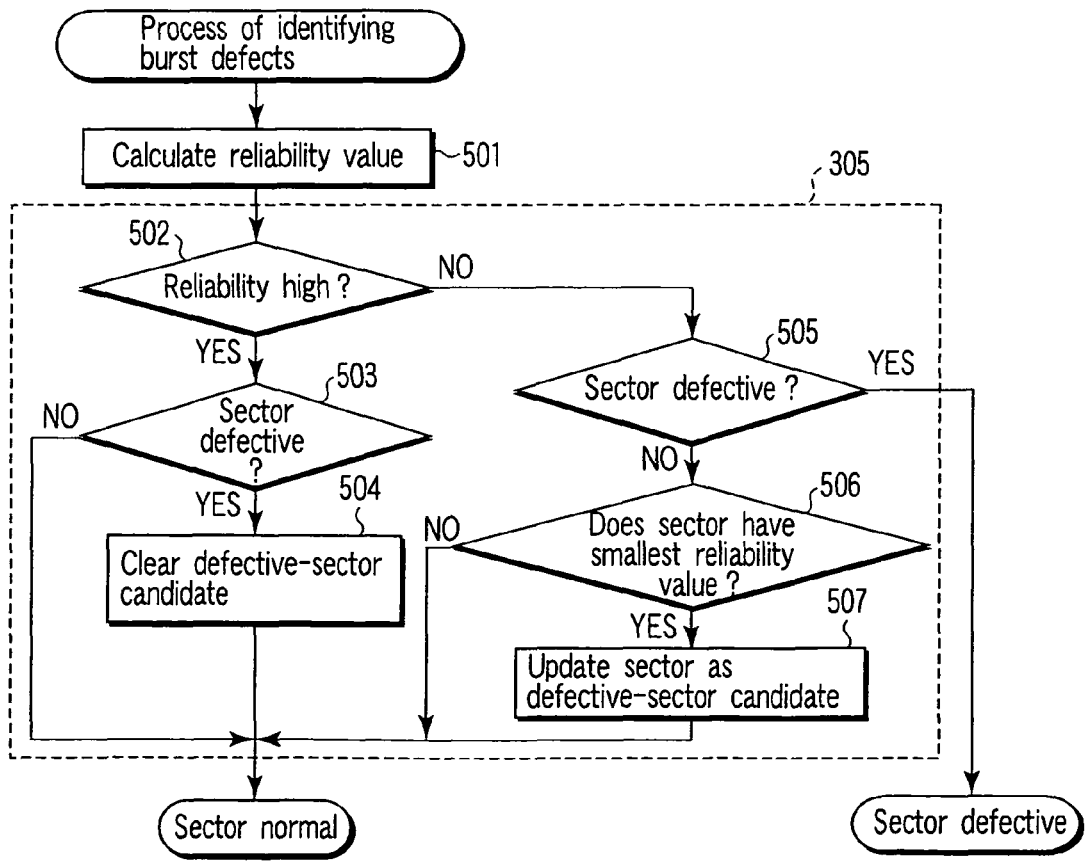
FIG. 6 is a flowchart explaining the sequence of identifying burst defects in the embodiment of this invention.

The process (Block 305 in FIG. 2) of detecting defects in the servo-burst patterns will be explained in detail, with reference to the flowchart of FIG. 6.

In the present embodiment, the CPU 19 does not determine that the servo-burst patterns have defects, even if the reliability value RV calculated is equal to or smaller than the preset value. Rather, the CPU 19 performs a process of identifying any defective sector that records servo-burst patterns having defects. More specifically, the sectors which have defects are reliably identified so that noise in the reliability value RV or a change of the value RV, resulting from the fluctuation in the seek operation (i.e., moving of the head 12) may not be detected as a burst defect.

First, the CPU 19 calculates a reliability value RV (Block 501). Then, the CPU 19 compares the reliability value RV with the preset value (reference value) (Block 502). If the reliability value RV is equal to or smaller than the preset value (NO in Block 502), the CPU 19 determines that the reliability of the sector is low. For the sake of convenience, "1" and "0" are used as the reliability value RV of any normal sector and that of any defective sector, in the present embodiment. The CPU 19 selects the lest reliable sector of all sectors of one track on the disk medium 11 and saves this sector as a defective-sector candidate in the memory 20, together with the reliable value of this sector. Further, the CPU 19 updates the sector having the smallest reliability value RV, as a defective-sector candidate.

Next, the CPU 19 determines whether the sector having the smallest reliability value RV has the same sector number as the least reliable sector (Block 505). If the sector having the smallest reliability value RV has the same sector number (YES in Block 505), the CPU 19 determines that this sector is a defective sector.

If the sector having the smallest reliability value RV does not have the same sector number as the least reliable sector (NO in Block 505), the CPU 19 does not determine that this sector is a defective sector.

When the disk drive starts operating, the least reliable sector is not saved in the memory 20. Therefore, even a sector having a small reliability value RV and having burst defects will be regarded as a normal sector. This does not matter, however, because such a sector scarcely influences the process of suppressing high-order synchronous residues. After the synchronous residues have been suppressed, such a sector is determined to have burst defects. The burst defects in any track on the DTM-type disk medium 11 lower the reliability value of the adjacent tracks. Hence, even if a near-distance seek, such as one-track seek, is performed, the defective-sector candidates will not be cleared and are determined, without fail, to be defective sectors.

Any sector that has noise and therefore has low reliability is indeed saved in the memory 20 as a defective-sector candidate. However, the defective-sector candidate will not be determined defective, because the possibility that its reliability may decrease is extremely low. Any sector that has a large reliability value RV but has the same sector number as a defective-sector candidate will be cleared from the memory, as will be described later.

The sector having the smallest reliability value RV may not have the same sector number the least reliable sector and may therefore be determined to have no burst defects (NO in Block 505). If this is the case, the CPU 19 determines whether this sector has a smaller reliability value RV than any preceding defective-sector candidate (Block 506). If the sector does not have a smaller reliability value RV (NO in Block 506), the CPU 19 determines that the sector is a normal sector, not defective. If the sector has the smallest reliability value RV (YES in Block 506), this sector is updated as a defective-sector candidate and saved in the memory 20 (Block 507).

Assume that one track on the disk medium 11 has only one defective sector. Then, the sector having a smaller reliability value than any other sectors of the track is updated as a defective sector. If any other sector may have a relatively small reliability value, the small reliability value is attributed to noise. The updating is repeated, if necessary, until the sector having the smallest reliability value in the track is identified.

If the reliability value RV is larger than the preset value (Block 501), the CPU 19 determines that the reliability of the sector is high (YES in Block 502). In this case, the CPU 19 determines whether the sector is defective (Block 503). In most cases, the CPU 19 determines that the sector is normal, not defective (NO in Block 503).

If the sector is found to be a defective-sector candidate (YES in Block 503), the defective-sector candidate is cleared in the memory 20 and the reliability value of the defective-sector candidate is changed to "1" (Block 504). In this case, the reliability value "1" indicates that the defective-sector candidate regarded as having low reliability is saved in the memory 20.

The decision sequence described above can reliably identify any sector having burst defects. The decision sequence performed in this embodiment, however, is based on the assumption that each track of the disk medium 11 scarcely has two or more defective sectors. In other words, each track has, if any, only one sector with burst defects. Thus, a sector is identified as one having burst defects, if its reliability value is repeatedly found to be small. In the process of determining whether the sector has burst defects, the sector may be identified as defective if all reliability values RV calculated for the sector are equal to or smaller than the preset value.

In the disk drive according to this embodiment, sectors having burst defects, if any, can be reliably detected and identified during the servo operation, before the use of the DTM-type disk medium 11. This prevents servo errors from propagating to the normal sectors of the disk medium 11. The advantages of the present embodiment will be specifically explained.

FIG. 8 is a diagram showing how the head-positioning accuracy changes, from one track to another of each sector, if servo defects exist in only one sector, e.g., sector No. 62. In FIG. 8, the numbers of the serve sectors are plotted on the abscissa, while the positioning error is plotted on the ordinate. Curve 100 indicates the average positioning error for each sector, curve 110 shows a value obtained by superposing all positioning-error signals, and curve 120 represents the maximum positioning error for each sector.

As clearly seen from FIG. 8, servo defects exist in one sector only. However, positioning errors will develop in a broad region if the ordinary servo operation is performed. This is probably because the iterative learning control type compensation for synchronous suppression is more influential than the feedback control, inevitably causing an erroneous compensation achieved by feed-forward control and ultimately resulting in positioning errors over a broad region.

Figure 9:
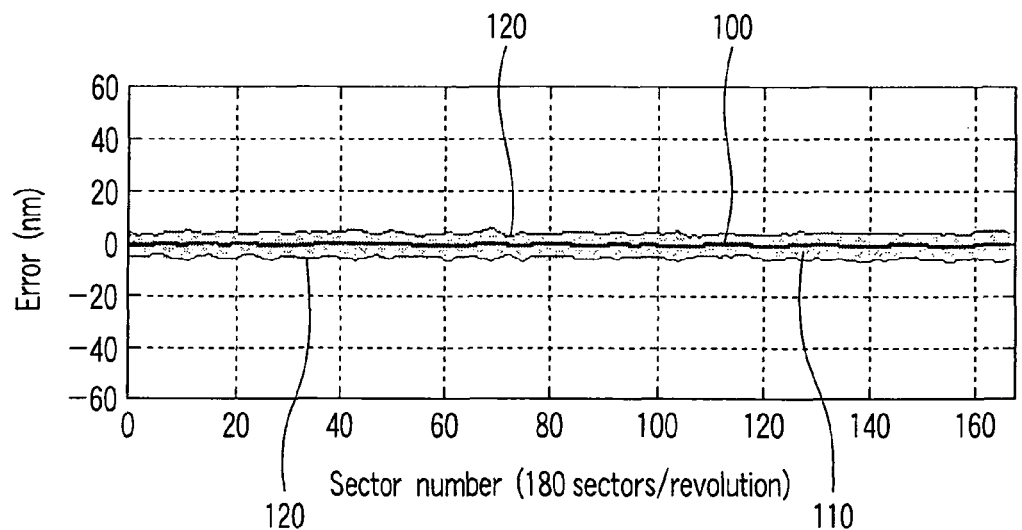
FIG. 9 is a diagram showing how the head-position accuracy changes, from one sector to another, demonstrating the advantage of the embodiment of the invention.

FIG. 9 is a diagram showing how the head-position accuracy changes, from one sector to another, if the sectors having burst defects are identified and a measure is taken for these sectors. As is evident from FIG. 9, the positioning error decreases with respect to each sector, and positioning errors are not made over a broad region. That is, servo errors do not propagate over a broad region, preventing servo defects from developing over many tracks, for example tens of tracks (cylinders). As a result, the effective storage capacity of the disk medium 11 can be increased, improving the storage efficiency of the medium 11.

The measures taken for the sectors having burst defects is to replace each servo-burst values of any defective sector, by the servo-burst values obtained from the immediately preceding sector. It is desirable to inhibit the writing of user data into any sector that has burst defects.

Figure 10:
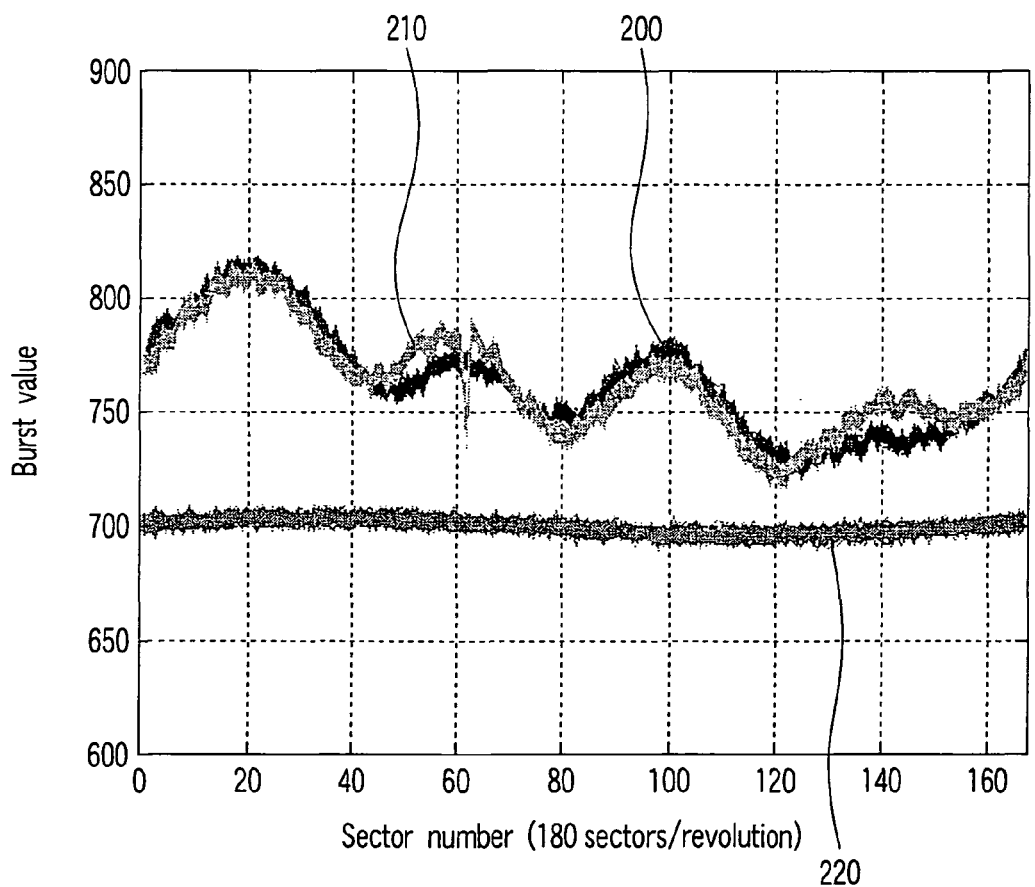
FIG. 10 is a diagram showing how the sum of burst values change, demonstrating the advantage of the embodiment of the present invention.

Servo-burst patterns can hardly formed uniformly on the DTM-type disk medium 11 as in most cases. Consequently, the sum of burst values can hardly be constant in the circumferential direction of the disk medium 11, as illustrated in FIG. 10. FIG. 10 is a diagram showing how the sum of burst values change in one of the tracks provided on the disk medium 11. In FIG. 10, curve 220 shows how the burst-value sum changes in a normal region of a disk medium in which servo data has been written by the conventional servo writer. Curve 200 shows how the burst-value sum changes in a normal region of a DTM-type disk medium. Curve 210 shows how the burst-value sum changes in a DTM-type disk medium if servo defects exist in sector No. 62 only.

As seen from FIG. 10, a defective sector (see curve 210) may have a greater burst-value sum than a normal sector (see curve 200), because the burst defects differ in magnitude. Hence, it is difficult to determine individual burst defects from the burst-value sum only. In the present embodiment, the LPF unit 32 performs an LPF operation as shown in FIG. 4, determining the magnitude of each burst error with high accuracy.

Thus, this embodiment can provide a disk drive that has the function of reliably detecting defects in the servo-burst patterns recorded in a disk medium. Therefore, head-positioning errors can be prevented during the servo operation.

Other Embodiment

Figure 3:
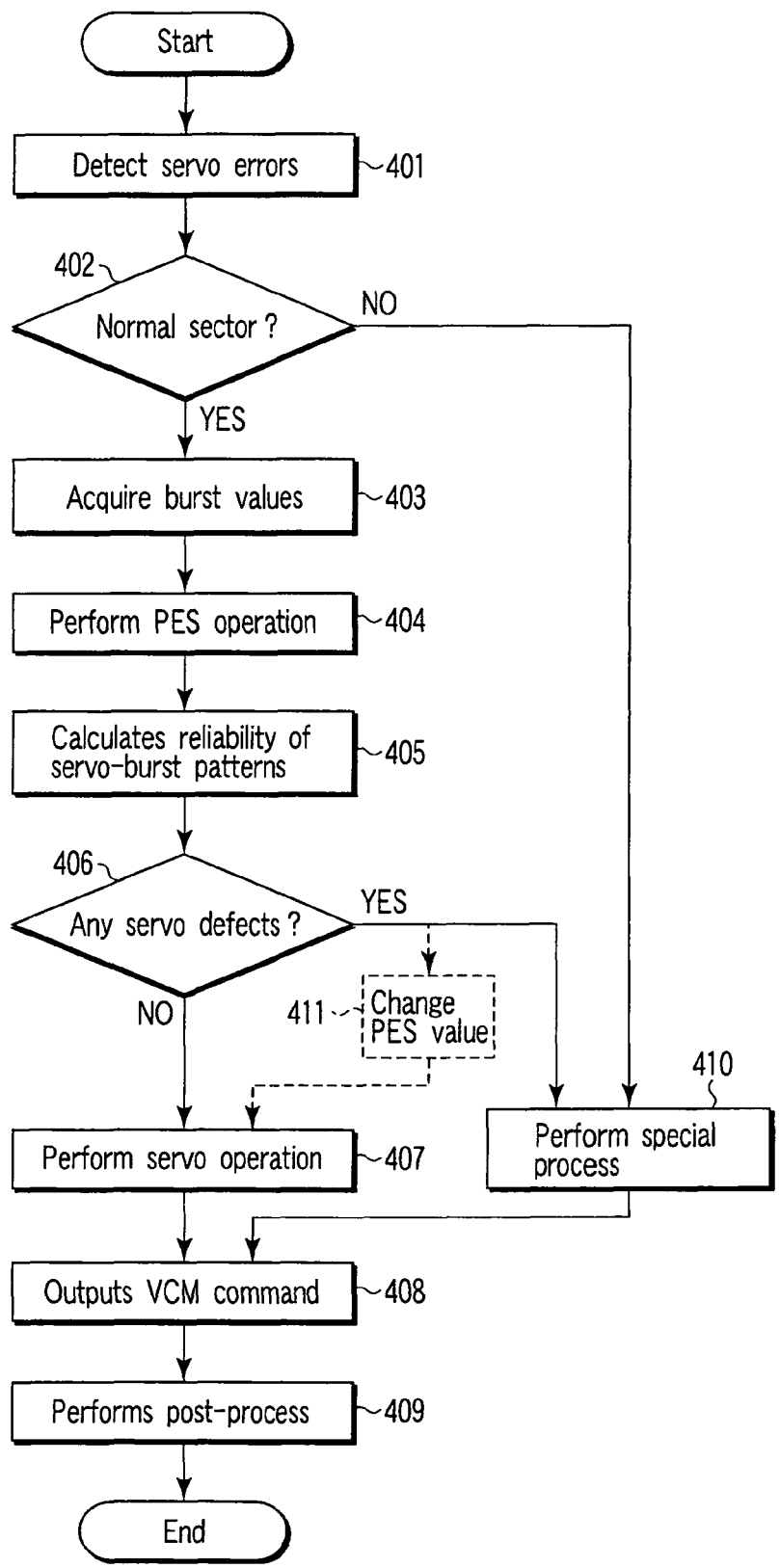
FIG. 3 is a flowchart explaining the sequence of detecting servo defects in another embodiment of the present invention.

FIG. 3 is a flowchart explaining the sequence of detecting servo defects in another embodiment of the present invention.

In the embodiment described above, the CPU 19 performs the PES operation (Block 306) if it determines that the sector is normal, having no servo defects (NO in Block 305), as is illustrated in FIG. 2.

In this embodiment, the CPU 19 performs the PES operation (Block 404) immediately after the servo-burst values have been acquired (Block 403). Further, in this embodiment, a special process will not be performed if the sector is found to have defects. Instead, the PSE value is changed (Block 411) if the sector is found to have defects (YES in Block 406). The process (Block 411) of changing the PES value is equivalent the measure taken for the defective sectors in the above-described embodiment. Therefore, the writing of the data recorded immediately before and after any defective servo sector is inhibited in order to maintain the reliability of the disk drive, if the PES value is changed and the ordinary servo operation is performed is then performed.

The method according to the other embodiment is identical to the method shown in FIG. 2, except Blocks 403, 404 and 411. Therefore, the Blocks other than Blocks 403, 404 and 411 are not explained herein.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
    a disk medium which has a plurality of sectors, in each of which servo data containing servo-burst patterns is recorded;
    a head which reads the data containing the servo-burst patterns, from the disk medium;
    a value-acquiring unit which acquires servo-burst values of each sector from the servo-burst patterns read by the head;
    a reliability-calculating unit which calculates the reliability value of a sector to be evaluated, from a ratio of the sum of the servo-burst values acquired from the sector, to a value obtained by performing low-pass filtering operation on the sum acquired at the time of detection or acquired for the immediately preceding sample; and
    a decision unit which determines whether the sector is a defective sector having defective servo-burst patterns, on the basis of the reliability value calculated by the reliability-calculating unit.

2. The disk drive according to claim 1, wherein the reliability-calculating unit performs a low-pass filtering operation at such a band as can monitor a moderate fluctuation that develops in the track including said plurality of sectors.

3. The disk drive according to claim 1, further comprising a controller which performs a prescribed special process when the decision unit determines that the defective sector exists on the disk medium.

4. The disk drive according to claim 1, wherein the servo data has been recorded in the disk medium by means of a transfer process.

5. The disk drive according to claim 1, wherein the disk medium has a discrete-track medium in which the servo data has been recorded by a discrete-track recording method.

6. The disk drive according to claim 1, in which the head includes a write-head element that writes, in the disk medium, data other than the servo data, and which further comprises a controller that inhibits the write head from writing the data in the disk medium when the decision unit determines that the defective sector exists on the disk medium.

7. The disk drive according to claim 1, wherein the reliability-calculating unit performs a low-pass filtering operation, thereby calculating a value that is approximate to the moving average of the sum.

8. The disk drive according to claim 1, wherein the decision unit identifies a sector having the smallest reliability value as a defective sector, saves the reliability value of the defective sector and the data identifying the defective sector in a memory, and determines that a sector is a defective sector when the sector to be evaluated has a reliability value smaller than a preset value and is identical to the defective sector saved in the memory.

9. The disk drive according to claim 1, wherein the decision unit identifies a sector having the smallest reliability value as a defective sector, saves the smallest reliability value and data identifying the defective sector in a memory, updates the reliability value of the defective sector in the memory when the sector to be evaluated has a reliability value larger than a preset value and is identical to the defective sector saved in the memory, and determines that a sector is a defective sector when the sector to be evaluated has a reliability value smaller than the preset value and is identical to the defective sector saved in the memory.

10. The disk drive according to claim 1, further comprising a unit which changes each servo-burst value of the sector to be evaluated, to the corresponding servo-burst value acquired from the sector immediately preceding the sector to be evaluated, when the decision unit determines that the defective sector exists on the disk medium.

11. A method of detecting servo defects, designed for use in a disk drive comprising a disk medium which has a plurality of sectors, in each of which servo data containing a servo-burst patterns is recorded, and a head which reads the data containing the servo-burst patterns, from the disk medium, the method comprising:
    acquiring servo-burst values of each sector from the servo-burst patterns read by the head;
    calculating the reliability value of a sector to be evaluated, from a ratio of the sum of the servo-burst values acquired from the sector, to a value obtained by performing low-pass filtering operation on the sum acquired at the time of detection or acquired for the immediately preceding sample; and
    determining whether the sector is a defective sector having defective servo-burst patterns, on the basis of the reliability value calculated.

12. The method according to claim 11, wherein a prescribed special process is performed when the decision unit determines that the defective sector exists on the disk medium.

13. The method according to claim 11, wherein a sector having the smallest reliability value is identified as a defective sector, the reliability value of the defective sector and the data identifying the defective sector are saved in a memory, and a sector is determined to be defective when the sector to be evaluated has a reliability value smaller than a preset value and is identical to the defective sector saved in the memory.

14. The method according to claim 11, wherein unit which each servo-burst value of the sector to be evaluated is changed to the corresponding servo-burst value acquired from the sector immediately preceding the sector to be evaluated, when it is determined that the defective sector exists on the disk medium.

* * * * *